Patented Nov. 17, 1942

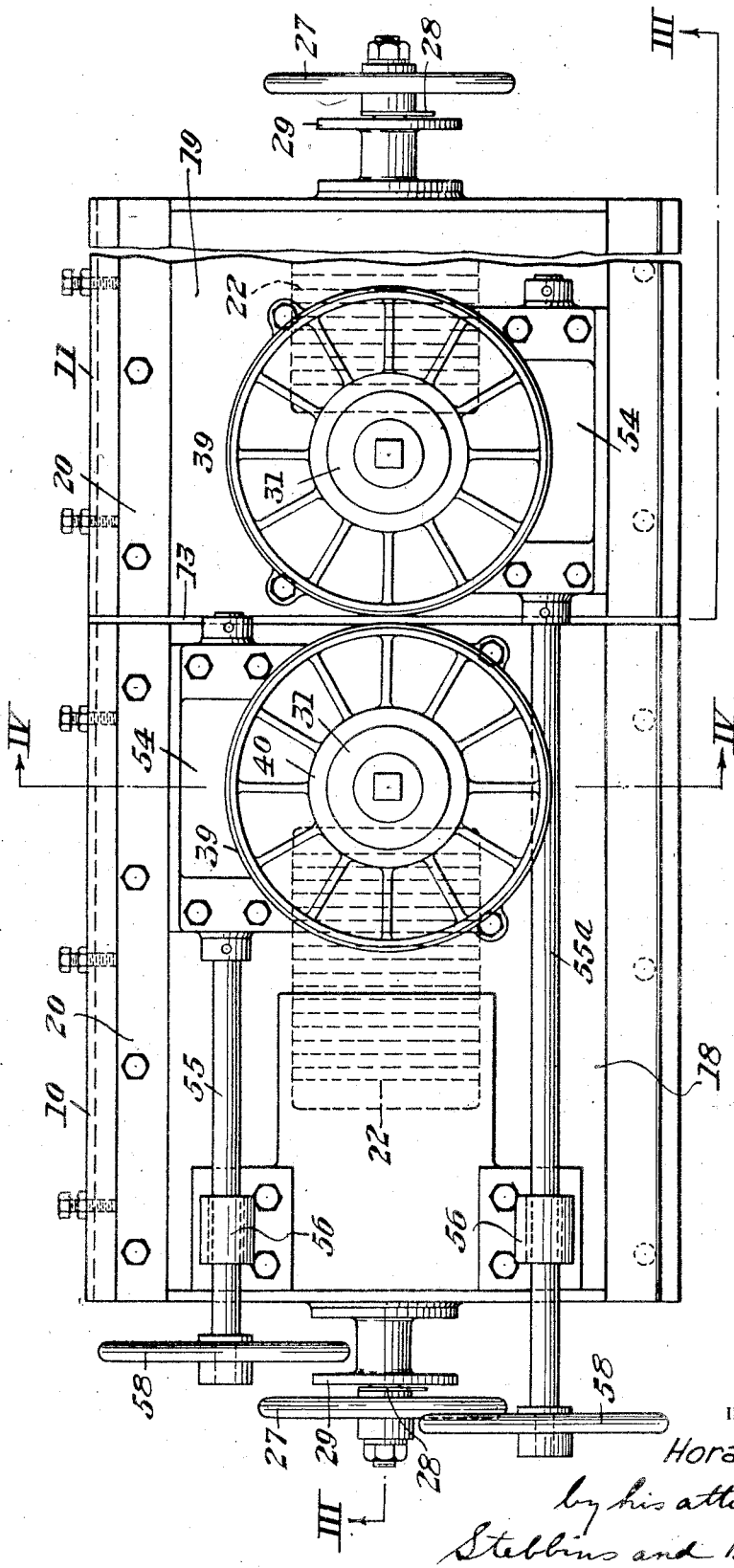

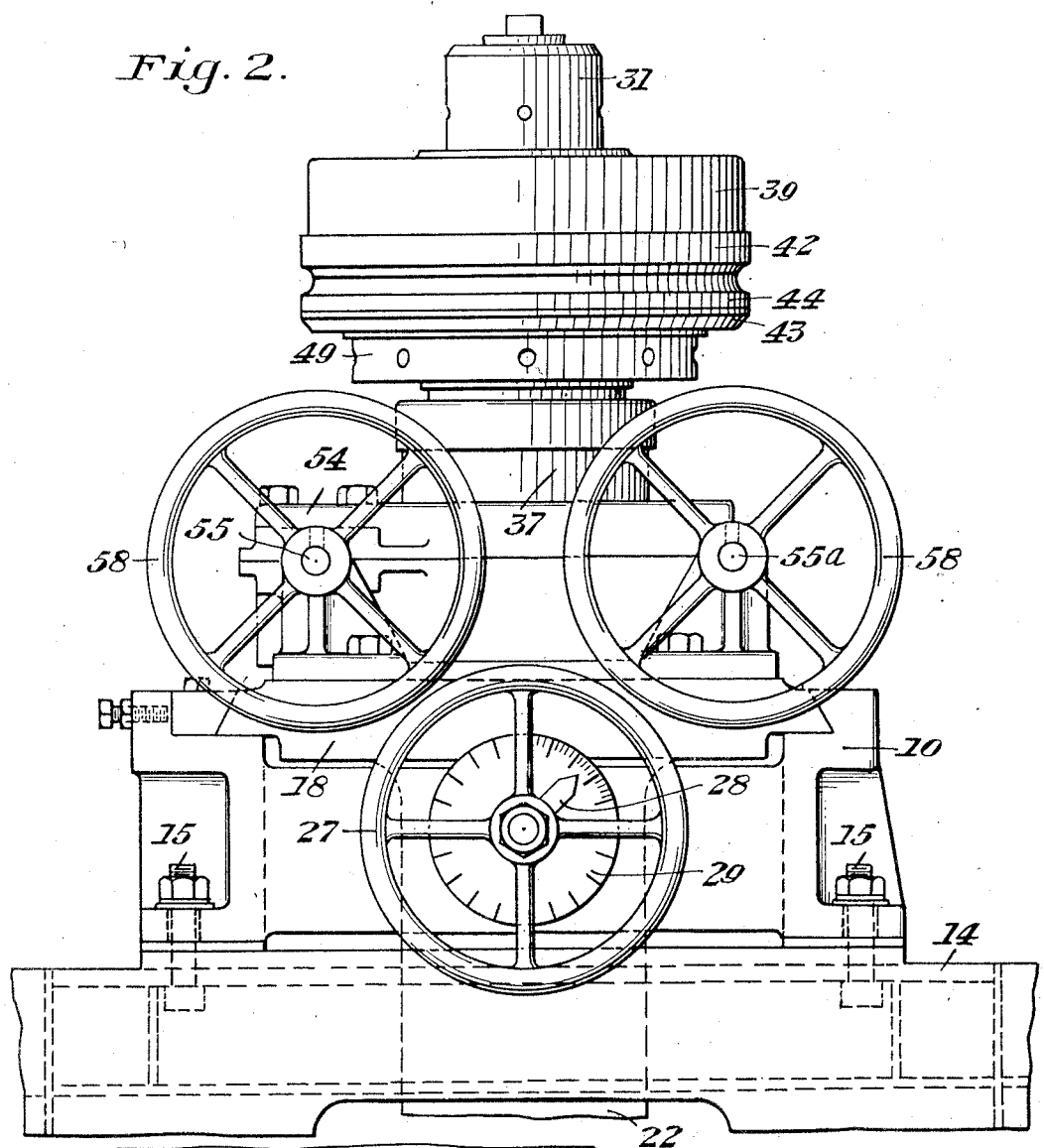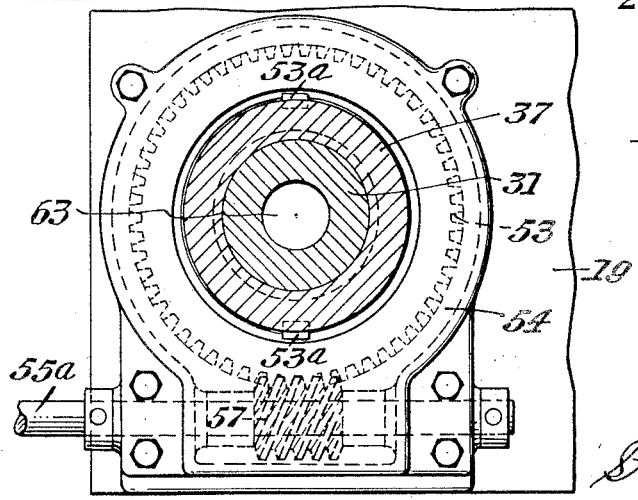

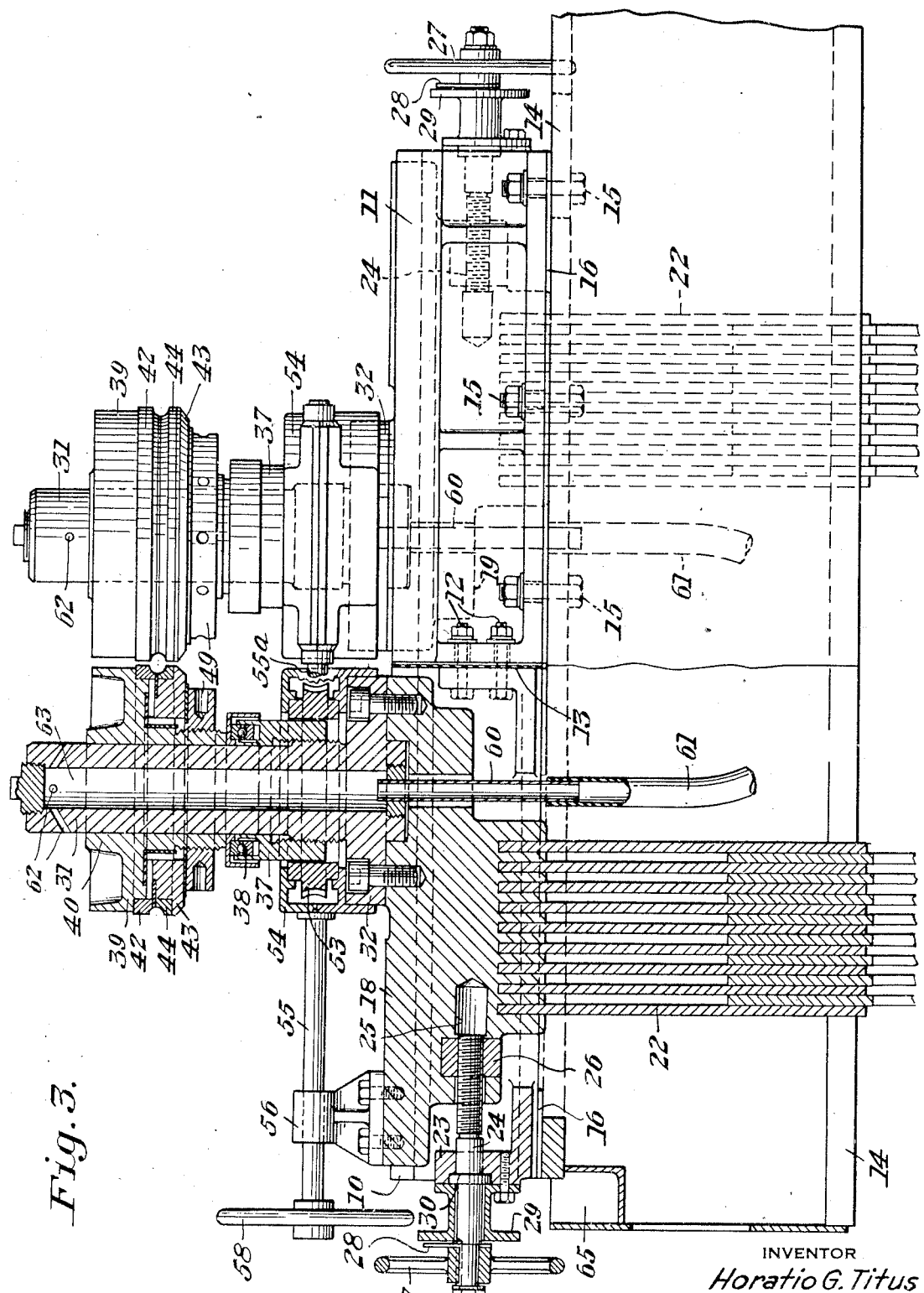

2,302,481

UNITED STATES PATENT OFFICE 2,302,481

ELECTRIC WELDING MACHINE

Horatio G. Titus, Youngstown, Ohio

Application September 18, 1941, Serial No. 411,270

5 Claims. (Cl. 219—6)

This invention relates to electric welding machines and, in particular, to welding machines adapted progressively to weld together the edges of a longitudinal seam cleft in a cylindrical tube blank.

Various forms of tube welding machines have been known heretofore and it is an object of my invention to improve generally upon such devices. In particular, it is an object of my invention to provide an electric welding machine which can be manufactured at a lower cost than similar machines as previously constructed. The principal object of my invention, however, is to provide a welding machine so constructed that the electrodes may be readily removed for replacement in a minimum time. Tube welding machines as previously constructed permit the changing of electrodes only at the expense of considerable lost time which reduces the output of the machine and involves, furthermore, a direct loss from the standpoint of labor cost.

In a preferred embodiment of my invention, I provide a pair of vertical bearing studs or posts on which cooperating rotary electrodes are journaled. The posts are supported exclusively from below, being free and unobstructed at their upper ends. The electrodes are supported on the studs by thrust bearings and are freely removable merely by lifting them off of the thrust bearings and over the ends of the studs.

I also provide means for adjusting the electrodes axially and the studs toward and from each other. I arrange for cooling the electrodes by supplying cooling fluid through the studs and by suitable discharge ports, to a space provided by shrouds extending around the electrodes.

The following detailed description and explanation of the invention may be fully understood by reference to the accompanying drawings illustrating the preferred embodiment of the invention. In the drawings, Figure 1 is a plan view;

Figure 2 is an end elevation looking from the left of Figure 1;

Figure 3 is a view partly in side elevation and partly in section along the line III—III of Figure 1;

Figure 5 is a transverse section through one of the bearing studs along the plane of line V—V of Figure 4.

Figure 4:
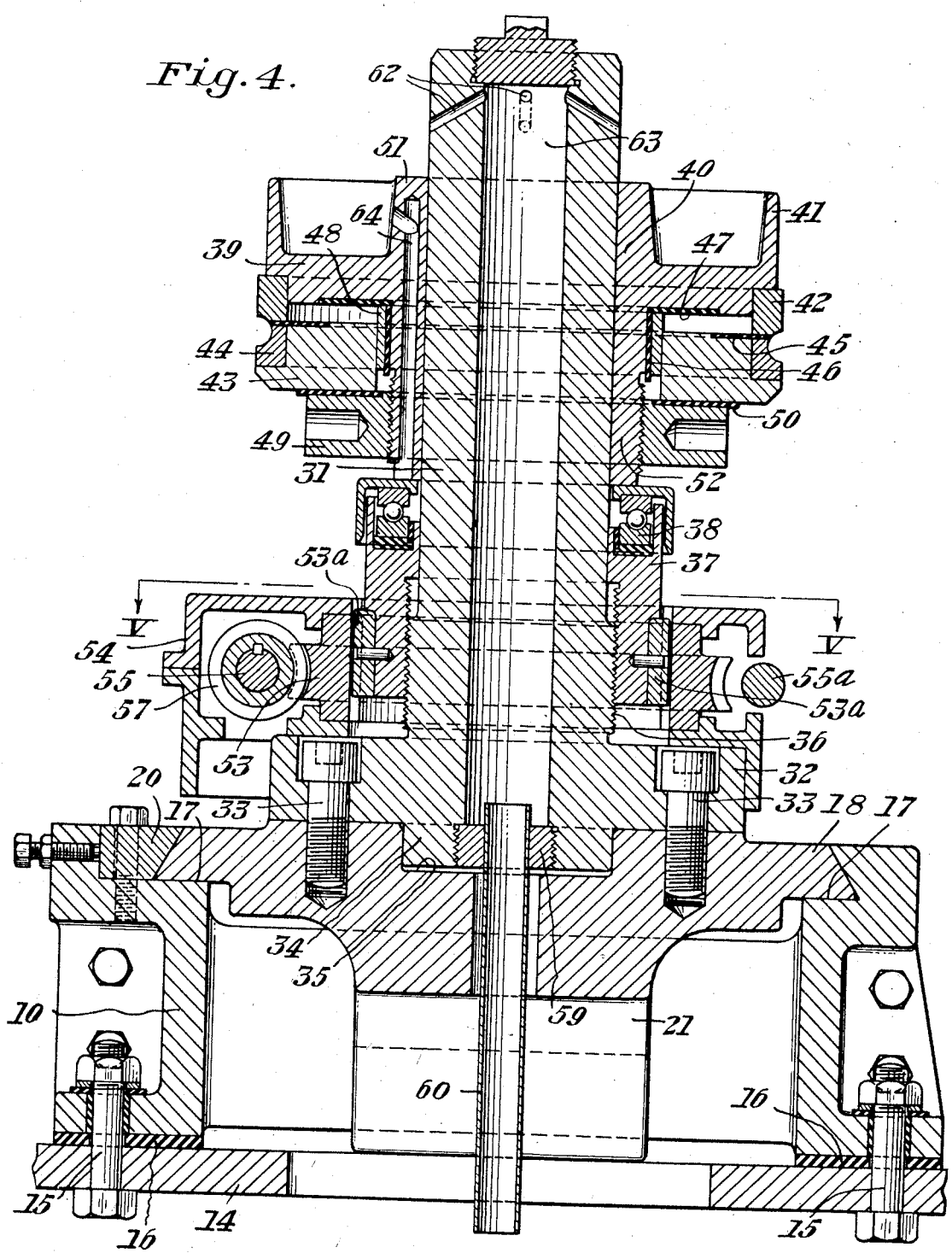
Figure 4 is a transverse section taken along the plane of line IV—IV of Figure 1.

Referring now in detail to the drawings, supporting castings 10 and 11 are secured together in end to end relation by bolts 12 with an insulated joint 13 therebetween. The castings 10 and 11 rest on a sub-base 14 fabricated from members of steel plate, as by welding. Bolts 15 anchor the castings 10 and 11 to the sub-base. A layer of insulation 16 is disposed between the castings and the sub-base.

The bolts 15 are insulated from the castings by suitable bushings and washers and the bolts 12 are similarly insulated from the casting 11.

The castings 10 and 11 have longitudinal ways 17 extending therealong. Slides or bases 18 and 19 are movable along the ways 17 being secured thereon by gibs 20. The slides 18 and 19 have depending portions 21 which are slotted to receive welding current supply means such as bus bars 22.

The slides 18 and 19 with their associated electrode and supporting structure are substantially identical. Only one of them, therefore, will be described in detail. Base casting 10 is provided with an upstanding lug 23 in which is journaled a screw shaft 24. The slide 18 is bored as at 25 to receive the threaded end of the shaft 24 and is recessed to receive a nut 26 through which the shaft is threaded. The outer end of the shaft is provided with a hand wheel 27. A pointer 28 is secured to the hand wheel and cooperates with a graduated disc 29 supported from the lug 23. The shaft 24 has a shoulder 30 which prevents axial shifting thereof. By virtue of this construction, rotation of the hand wheel 27 effects adjustment of the slide 18 along the ways 17. It will be understood, of course, that the screws securing the gib 20 must be backed off to permit such adjustment after which they may again be tightened down to hold the slide firmly in adjusted position.

A bearing stud 31 having a bottom flange 32 is secured to the slide 18 by screws 33. The stud 31 has a boss 34 seating in a recess 35 in the slide 18. The stud 31 is threaded adjacent its lower end as at 36 and a bearing collar 37 having a bore cooperatively threaded is adjustable vertically on the stud by rotation relative thereto. The collar 37 carries a thrust bearing 38.

An electrode indicated generally at 39 is journaled on the stud 31 being supported at predetermined level by the thrust bearing 38. The electrode 39 comprises a hub 40 which is bored to fit the stud 31 closely. A shroud 41 extends upwardly from the electrode providing a cooling fluid space. A welding ring 42 is carried by the electrode 39 for contact with the cleft edges of formed tube blanks.

It will be apparent from the foregoing description that the stud 31 is in electrically conducting engagement with the slide 18 and with the electrode 39. Welding current is thus supplied directly to the electrode through the sliding contact thereof on the stud 31.

The electrode 39 also includes a back-up ring 43 having a hardened insert 44. The ring 43 and its insert 44 are separated from the remainder of the electrode by insulation rings 45, 46 and 47. The back-up ring 43 slides axially on a collar 48 surrounding the insulation ring 46. An electrode clamping nut 49 is threaded on the lower end of the hub 40 to hold the ring 43 in assembled relation with the remainder of the electrode. An insulation ring 50 separates the nut from the back-up ring. The upper and lower extensions of the hub 40 indicated at 51 and 52 provide an extensive area of contact with the stud 31 whereby relatively large welding currents may be delivered to the electrode.

A worm wheel ring 53 is keyed to the bearing collar 37 and is rotatable within a housing 54 secured to the bottom flange 32 of the stud 31. A worm shaft 55 is journaled in the housing 54 and an outboard bearing 56, and is provided with a worm 57 meshing with the worm wheel ring 53. A hand wheel 58 on the outer end of the shaft 55 facilitates manual operation of the shaft to cause rotation of the worm wheel ring and the bearing collar 37 to effect vertical adjustment of the latter. Vertical adjustment of the collar in the worm wheel ring is permitted by the keys 53a.

It will be apparent from the foregoing that, in addition to the adjustment of the electrodes and their supports toward and from each other by operation of the hand wheels 27, each electrode may be adjusted individually on its bearing stud by operation of the hand wheels 58. The worm shaft for the right hand electrode, as viewed in Figure 1, is designated 55a since it differs in length from the shaft 55.

Cooling fluid is supplied to the interior of the studs 31 and to the space defined by the electrode shrouds 41. A plug 59 is threaded in the lower end of each stud 31 and is provided with a pipe 60 extending therethrough to which a hose connection 61 is adapted to be secured. Radial ports 62 extend from the hollow interior 63 of the stud 31 and discharge fluid delivered to the latter outwardly and downwardly into the space within the shroud 41. Drain passages 64 extend downwardly through the hub 40 of the electrode whereby cooling fluid overflows from the space within the shroud and flows downwardly over the thrust bearing 38, the collar 37 and the housing 54. Eventually, the cooling fluid drains into a collecting trough 65 in the sub-base 14.

As clearly shown in the drawings, the bearing studs 31 are free at their upper ends so that the electrodes 39 may be removed therefrom by a straight lift. This is a great advantage from the standpoint of actual operating conditions, since frequent electrode changes are necessary. With the construction described herein, it is possible to replace the electrodes within a much shorter time than has been possible heretofore with electric welding machines as previously constructed. In fact, the invention permits the time necessary for electrode changes to be reduced to about ⅓ that previously required. This results in a direct saving in labor cost and in loss of production during shut downs necessitated by electrode changes.

A further advantage of the invention is that the cost of an electric welding machine according to my invention is materially less than that of machines built according to previous designs for welding the same class of product. Further advantages reside in the flexibility of adjustment which is made possible by mounting the electrodes for individual movement horizontally and vertically. The electrodes remain in position on their supporting studs solely by virtue of their own weight so that it is not necessary to break any connections to change electrodes. The construction of my invention, furthermore, has ample provision for the circulation of cooling fluid through the portions of the apparatus subject to heating by the passage of welding current therethrough.

Although I have illustrated and described but a preferred embodiment of the invention, it will be recognized that changes in the construction disclosed may be made without departing from the spirit of the invention or the scope of the appended claims.

I claim:

1. In a welding machine, a vertical bearing stud having its upper end free, an electrode journaled on said stud, a thrust bearing on said stud supporting said electrode for rotation at a predetermined level, a collar threaded on said stud for supporting said thrust bearing and a ring gear keyed to said collar whereby it may be rotated on said stud to adjust the thrust bearing vertically.

2. In a welding machine, a base, a vertical bearing stud fixed on said base and having its upper end free, an electrode journaled on said stud and having sliding contact therewith, a thrust bearing on said stud supporting said electrode for rotation at a predetermined level, a collar extending around and threaded on said stud for supporting said thrust bearing, and means on the base for rotating the collar on the stud to adjust the bearing vertically.

3. In an electric welding machine, a supporting member, a base movable along said member, a vertical bearing stud fixed on said base, an electrode journaled on said stud, a thrust bearing on said stud supporting said electrode for rotation at a predetermined level, a collar extending around and threaded on said stud for supporting said bearing, and means mounted on and movable with said base for turning said collar and thereby adjusting said thrust bearing vertically.

4. In an electric welding machine, a non-rotatable, fixed, hollow, vertical, bearing stud, an electrode journaled for rotation on said stud, a non-swiveling cooling-fluid connection rigidly secured to the lower portion of the stud, and radial ports in the upper end of the stud above the top of the electrode whereby cooling fluid delivered through said connection flows up through the stud and outwardly and downwardly onto said electrode.

5. In an electric welding machine, a bearing stud of highly conductive material, a rotary electrode journaled on said stud and having sliding contact therewith, means for supplying welding current to said stud, a hub extension on said electrode providing an increased area of contact between the electrode and stud, and a thrust bearing on said stud engaged by said extension, thereby supporting the electrode at a predetermined level.

HORATIO G. TITUS.